United States Patent
Chen et al.

(10) Patent No.: US 8,239,672 B2
(45) Date of Patent: Aug. 7, 2012

(54) METHOD OF AUTOMATICALLY ESTABLISHING A SECURITY LINK FOR A WIRELESS COMMUNICATION SYSTEM AND RELATED COMMUNICATION DEVICE

(75) Inventors: Chih-Chang Chen, Taichung County (TW); Sung-Chien Tang, Taoyuan County (TW)

(73) Assignee: Ralink Technology, Corp., Jhubei, Hsinchu County (TW)

( * ) Notice: Subject to any disclaimer, the term of this patent is extended or adjusted under 35 U.S.C. 154(b) by 630 days.

(21) Appl. No.: 12/468,057

(22) Filed: May 19, 2009

(65) Prior Publication Data
US 2010/0115271 A1    May 6, 2010

(30) Foreign Application Priority Data
Oct. 31, 2008    (TW) .............................. 97141976 A

(51) Int. Cl.
*H04L 9/00* (2006.01)
(52) U.S. Cl. ....................................... 713/160; 380/270
(58) Field of Classification Search ................... 713/160
See application file for complete search history.

(56) References Cited

U.S. PATENT DOCUMENTS

| | | | |
|---|---|---|---|
| 6,421,347 B1 * | 7/2002 | Borgstahl et al. | 370/401 |
| 7,616,594 B2 * | 11/2009 | Roberts et al. | 370/310 |
| 7,804,807 B2 * | 9/2010 | Korus et al. | 370/338 |
| 2006/0239208 A1 | 10/2006 | Roberts | |
| 2008/0226071 A1 * | 9/2008 | Braskich et al. | 380/258 |
| 2009/0109870 A1 * | 4/2009 | Metke et al. | 370/254 |

FOREIGN PATENT DOCUMENTS
CN    101288063 A    10/2008
* cited by examiner

*Primary Examiner* — Matthew Smithers
(74) *Attorney, Agent, or Firm* — Winston Hsu; Scott Margo

(57) ABSTRACT

A method for a access point device having first network identity information to automatically establish a security link with a peer access point device in a wireless communication system includes searching and receiving a beacon corresponding to the peer access point device by radio frequency scan, obtaining second network identity information corresponding to the peer access point device from the beacon, determining a primary-secondary relationship for the access point device and the peer access point device according to the first and second network identity information, generating or receiving security data according to the primary-secondary relationship, and then establishing the security link with the peer access point device according to the security data.

16 Claims, 7 Drawing Sheets

METHOD OF AUTOMATICALLY ESTABLISHING A SECURITY LINK FOR A WIRELESS COMMUNICATION SYSTEM AND RELATED COMMUNICATION DEVICE

BACKGROUND OF THE INVENTION

1. Field of the Invention

The present invention relates to a method of establishing a security link and related communication device, and more particularly, to a method of automatically establishing a security link and related communication device.

2. Description of the Prior Art

Wireless distribution system (WDS) is used for realizing wireless communication between access point devices of a wireless local area network. The communication between the access point devices requires use of the same security key, the same encryption algorithm, and the same wireless channel.

An access point device is usually capable of a wireless distribution system link, and includes kinds of security technologies, such as wired equivalent privacy (WEP), advanced encryption standard (AES), and temporal key Integrity protocol (TKIP). In order to establish a wireless distribution system link with a peer access point device, an access point device usually provides an user interface for an user, for selecting a security key and an encryption algorithm, and setting a Medium Access Control (MAC) address of the peer access point device. The user has to select the same security key, encryption algorithm, and wireless channel on both the user interfaces of the access point devices, and further input the each other's MAC address for establishing a security link. However, these setting items are technical terms about which the user usually does not have network knowledge. Therefore, manually setting up the security link of the wireless distribution system link causes the user's trouble and reduces the user's willingness to use the security link.

SUMMARY OF THE INVENTION

Therefore, the present invention provides a method of automatically establishing a security link between two access point devices and related communication device, to enhance the user willingness to use encryption transmission.

The present invention discloses a method for an access point device having first network identity information to automatically establish a security link with a peer access point device in a wireless communication system. The method includes searching and receiving a beacon corresponding to the peer access point device by radio frequency scan, obtaining second network identity information corresponding to the peer access point device from the beacon, determining a primary-secondary relationship for the access point device and the peer access point device according to the first and second network identity information, generating or receiving security data according to the primary-secondary relationship, and establishing the security link with the peer access point device according to the security data.

The present invention further discloses an access point device for automatically establishing a security link with a peer access point device in a wireless communication system. The access point device includes a storage device, a radio frequency module, an interpretation unit, an identity positioning unit, a primary mode unit, a secondary mode unit, and a link establishment unit. The storage device is used for storing first network identity information. The radio frequency module is used for searching and receiving a beacon corresponding to the peer access point device by radio frequency scan. The interpretation unit is coupled to the radio frequency module, and used for obtaining second network identity information corresponding to the peer access point device from the beacon. The identity positioning unit is coupled to the interpretation unit and the radio frequency module, and used for determining a primary-secondary relationship for the access point device and the peer access point device according to the first and second network identity information. The primary mode unit is coupled to the identity positioning unit, and used for generating first security data to the peer access point device according to the primary-secondary relationship. The secondary mode unit is coupled to the identity positioning unit, and used for receiving second security data transmitted from the peer access point device according to the primary-secondary relationship. The link establishment unit is coupled to the primary mode unit and the secondary mode unit, and used for establishing the security link with the peer access point device according to the first and second security data.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
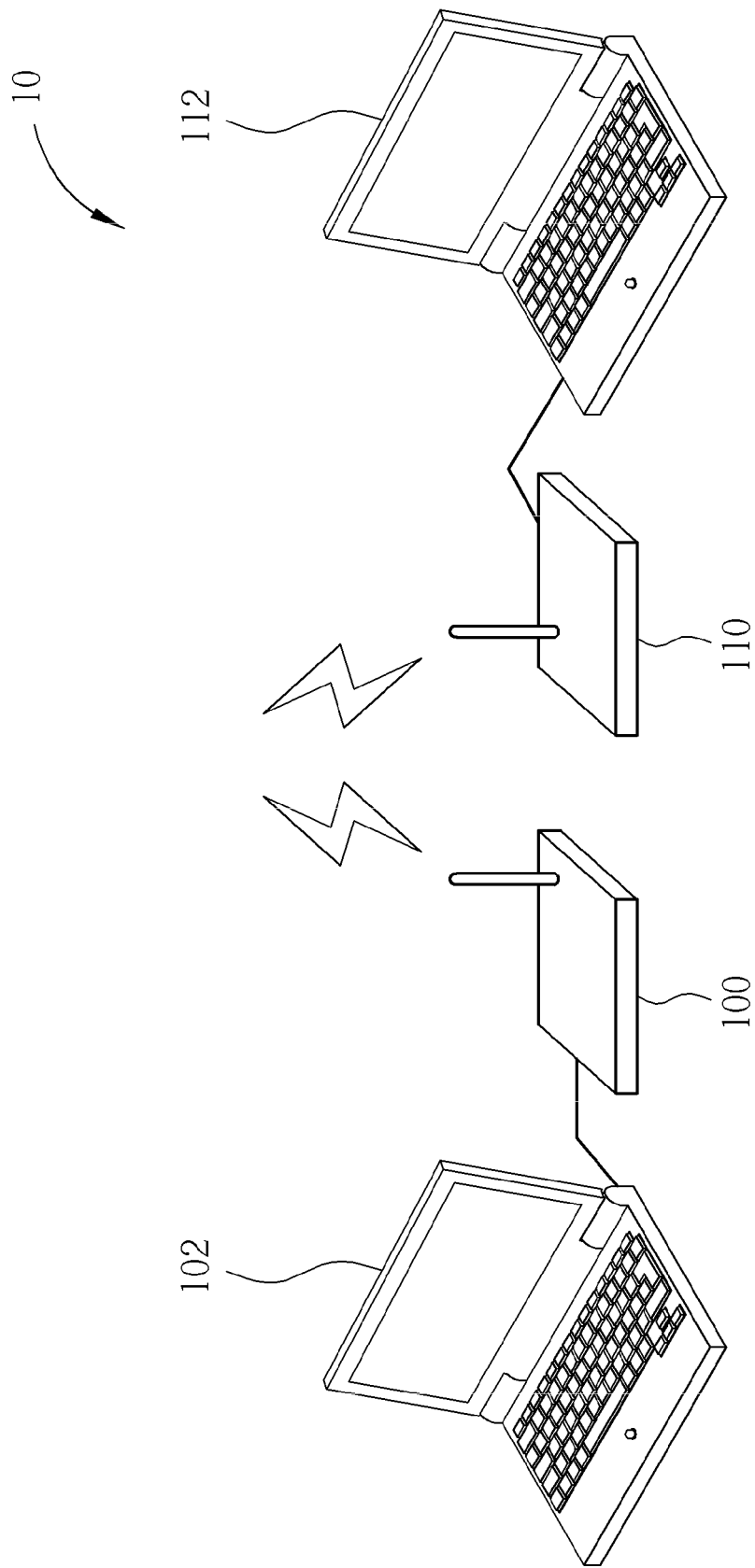
FIG. 1 is a schematic diagram of a wireless distribution system according to an embodiment of the present invention.

Please refer to FIG. 1, which is a schematic diagram of a wireless distribution system (WDS) 10 according to an embodiment of the present invention. The wireless distribution system 10 includes access point devices 100 and 110 respectively coupled to stations (STA) 102 and 112 by cables. The access point devices 100 and 110 transmit network identity information through wireless communication, for performing security link establishment, certification, and packet transmission. Before the stations 102 and 112 transmit information to each other, an user drives the access point devices 100 and 110 to perform a security link establishment procedure automatically through an user interface of either the station 102 or the station 112, for establishing a wireless distribution system with a security link, to ensure the safety of the packet transmission.

Figure 2:
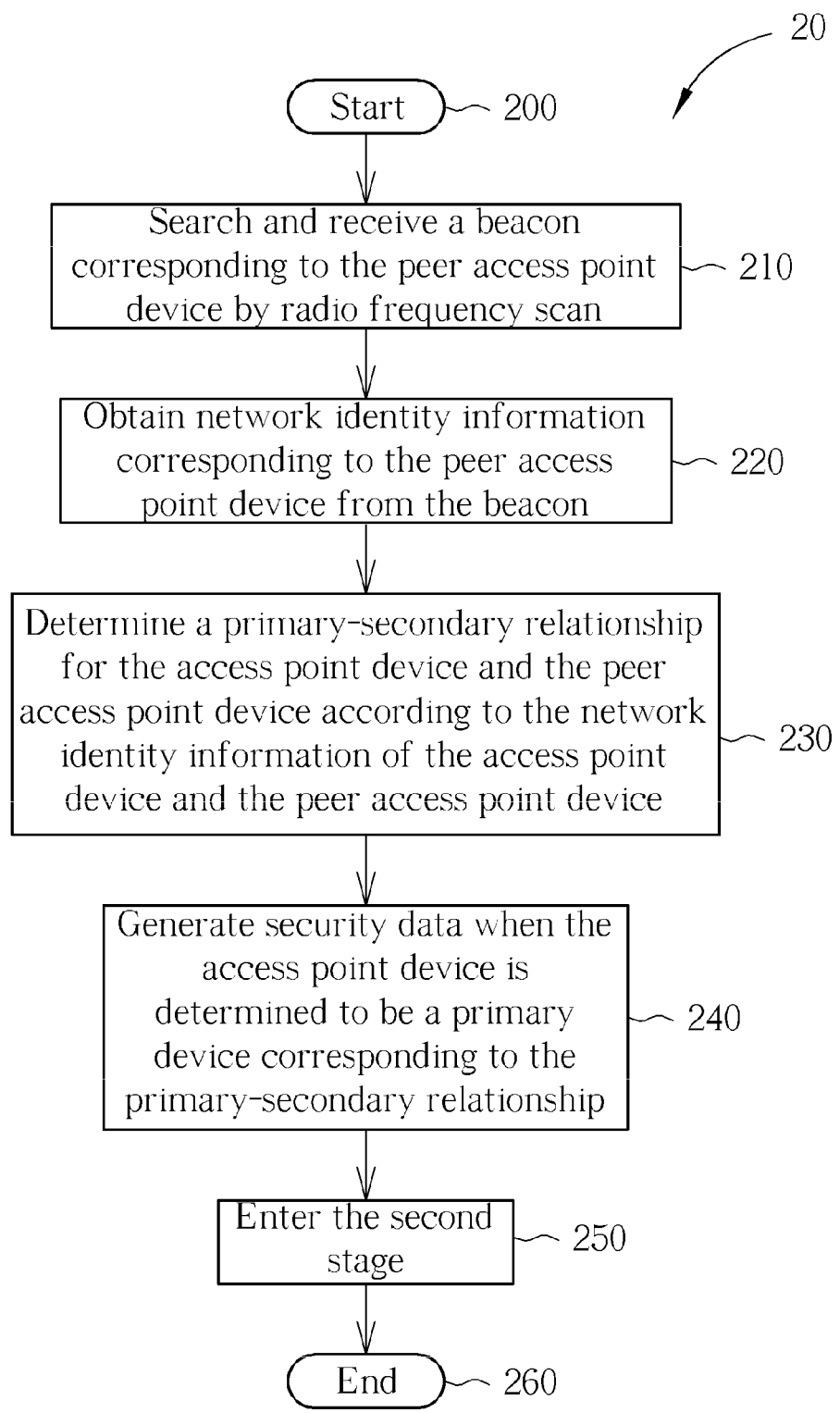
FIG. 2 is a flowchart diagram of a link preparation process according to an embodiment of the present invention.

In the embodiment of the present invention, the security link establishment procedure has two stages. The first stage is a link preparation process, and the second stage is a link connection set handshaking process. Please refer to FIG. 2, which is a flowchart diagram of a link preparation process 20 according to an embodiment of the present invention. The link preparation process 20 of the first stage is utilized for an access point device to obtain network information of a peer access point device in a wireless distribution system, and to store the network information for the second stage. Take FIG. 1 as an example. If the access point device 100 starts the link preparation process 20, the access point device 110 is treated as a peer access point device, contrariwise. The link preparation process 20 includes the following steps:

Step 200: Start.

Step 210: Search and receive a beacon corresponding to the peer access point device by radio frequency scan.

Step 220: Obtain network identity information corresponding to the peer access point device from the beacon.

Step 230: Determine a primary-secondary relationship for the access point device and the peer access point device according to the network identity information of the access point device and the peer access point device.

Step 240: Generate security data when the access point device is determined to be a primary device corresponding to the primary-secondary relationship.

Step 250: Enter the second stage.

Step 260: End.

According to the link preparation process 20, the access point device searches and receives the beacon broadcasted by the peer access point device by the radio frequency scan, and obtains the network identity information corresponding to the peer access point device from the beacon, such as a device name (Service Set Identifier, SSID) and a Medium Access Control (MAC) address. The access point device can find existence of the peer access point device through the beacon. If the access point device finds more than two peer access point devices at the same time, the access point device ignores the searching result, and re-searches after waiting a period of time. After the peer access point device is found, the access point device determines the primary-secondary relationship according to the network identity information of the access point device and the peer access point device. According to the present invention, the access point device and the peer access point device can determine the role, e.g. comparing the MAC addresses, when the access point device realizes the peer access point device has greater MAC address, the access point knows it should be the registrar (primary) and the peer access point device acts as the enrollee (secondary).

Preferably, Step 230 determines a registrar (primary device) and an enrollee (secondary device) of the primary-secondary relationship according to the MAC addresses of the access point device and the peer access point device. The registrar-enrollee relationship conforms to a primary-secondary relationship of Wi-Fi Protected Setup (WPS) standard. For example, when the access point device has a greater MAC address than the peer access point device, the access point device is the registrar, and the peer access point device is the enrollee. In this situation, the access point device generates the security data necessary for the access point device and the peer access point device, such as connection set information, and then enters the second stage. For example, the access point device randomly selects an encryption algorithm, generates a security key, and then enters the second stage. On the contrary, if the peer access point device is the registrar, the security data is generated by the peer access point device.

Therefore, the access point device and the peer access point device find each other out through the link preparation process 20, and determine the primary-secondary relationship, for generating the security data used for the second stage.

Figure 3:
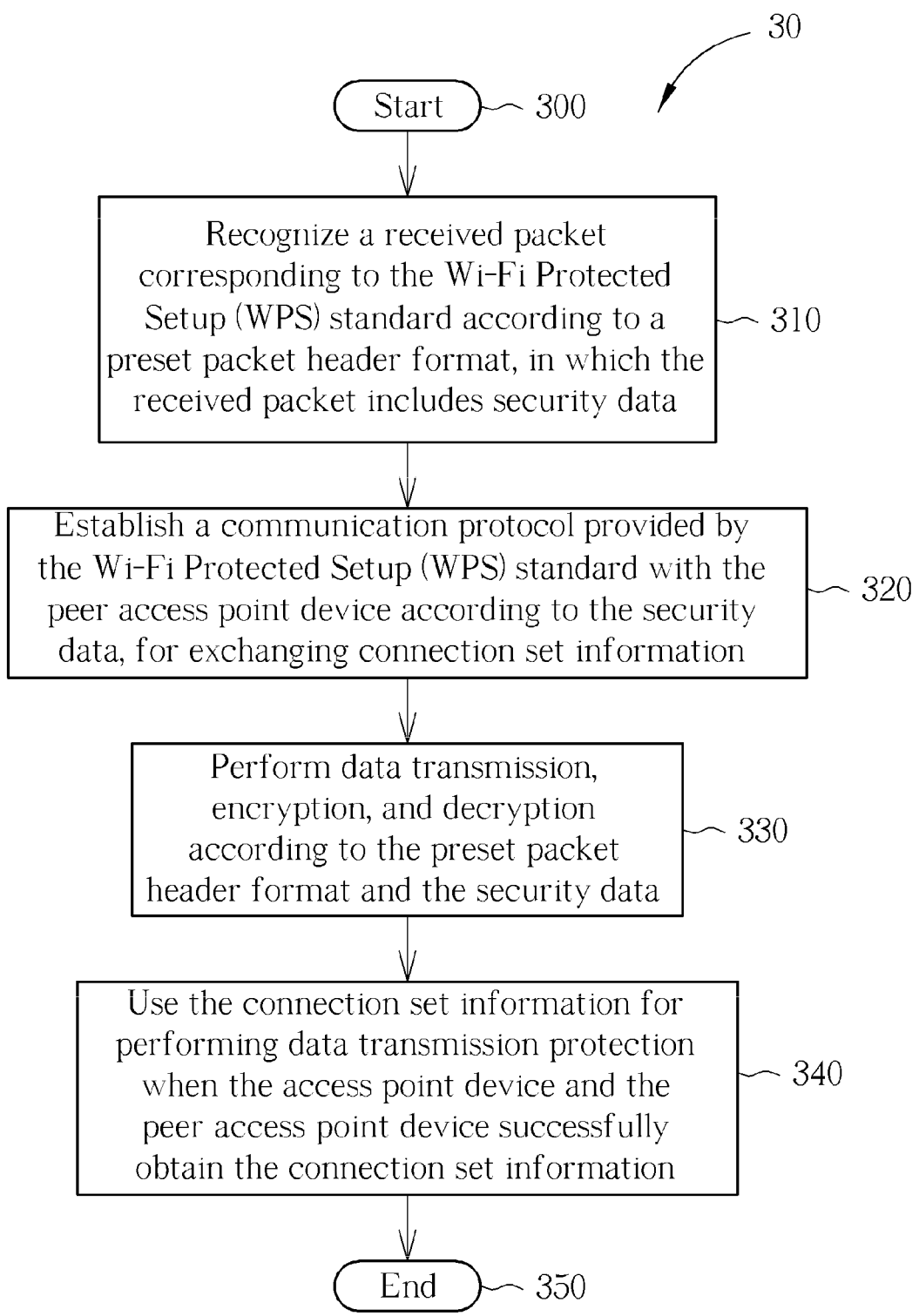
FIG. 3 is a flowchart diagram of a link connection set handshaking process according to an embodiment of the present invention.

In the second stage, the present invention provides an embodiment of a link connection set handshaking process, which is based on a wireless distribution system combined with the WPS standard, for achieving WPS security on packet transmission of the WDS system. Please refer to FIG. 3, which is a flowchart diagram of a link connection set handshaking process 30 according to an embodiment of the present invention. For convenience, the link connection set handshaking process 30 is utilized in the access point device of the enrollee, and used for establishing a WPS security link based on the WDS system with the peer access point device. The link connection set handshaking process 30 includes the following steps:

Step 300: Start.

Step 310: Recognize a received packet corresponding to the Wi-Fi Protected Setup (WPS) standard according to a preset packet header format, in which the received packet includes security data.

Step 320: Establish a communication protocol provided by the Wi-Fi Protected Setup (WPS) standard with the peer access point device according to the security data, for exchanging connection set information.

Step 330: Perform data transmission, encryption, and decryption according to the preset packet header format and the security data.

Step 340: Use the connection set information for performing data transmission protection when the access point device and the peer access point device successfully obtain the connection set information.

Step 350: End.

According to the link connection set handshaking process 30, after the access point device acts as the enrollee, the access point device listens to a certain frequency band for receiving packets transmitted from the peer access point device, and compares the header of the received packet according to the preset packet header format, to recognize the received packet corresponding to the Wi-Fi Protected Setup (WPS) standard. The received packet includes the security data generated by the peer access point device in the first stage, such as the connection set information, to establish the security link of the WPS standard between the access point device and the peer access point device, and to exchange the connection set information. The access point device loads transmission data into the packet with security according to the preset packet header format and the security data. After the access point device and the peer access point device obtain both the connection set information, the access point device uses the connection set information to protect all following data transmissions.

In Step 310, the preset packet header format is a MAC packet header format, which is based on a header format of the wireless distribution system and added information of the WPS standard. Please refer to FIG. 4, which is a schematic diagram of a MAC packet header format 40 according to an embodiment of the present invention. The MAC packet header format 40 from left to right includes a frame control field 400, an ID field 410, first, second, and third address fields 420-440, a sequence control field 450, and a fourth address field 460. The ID field 410 could be a duration field. The fourth address field 460 is a 6-bit field employed for the embodiment of the present invention. The rest of fields are the format according to the prior art, so the detailed description of the related fields are omitted herein. In addition, please refer to FIG. 5, which is a schematic diagram of a format of the frame control field 400 shown in FIG. 4. For focusing on the related operation of the embodiment of the present invention, FIG. 5 only shows that a "To DS" field 500 and a "From DS" field 510 are included in the frame control field 400 of which other fields are omitted herein.

Figure 5:
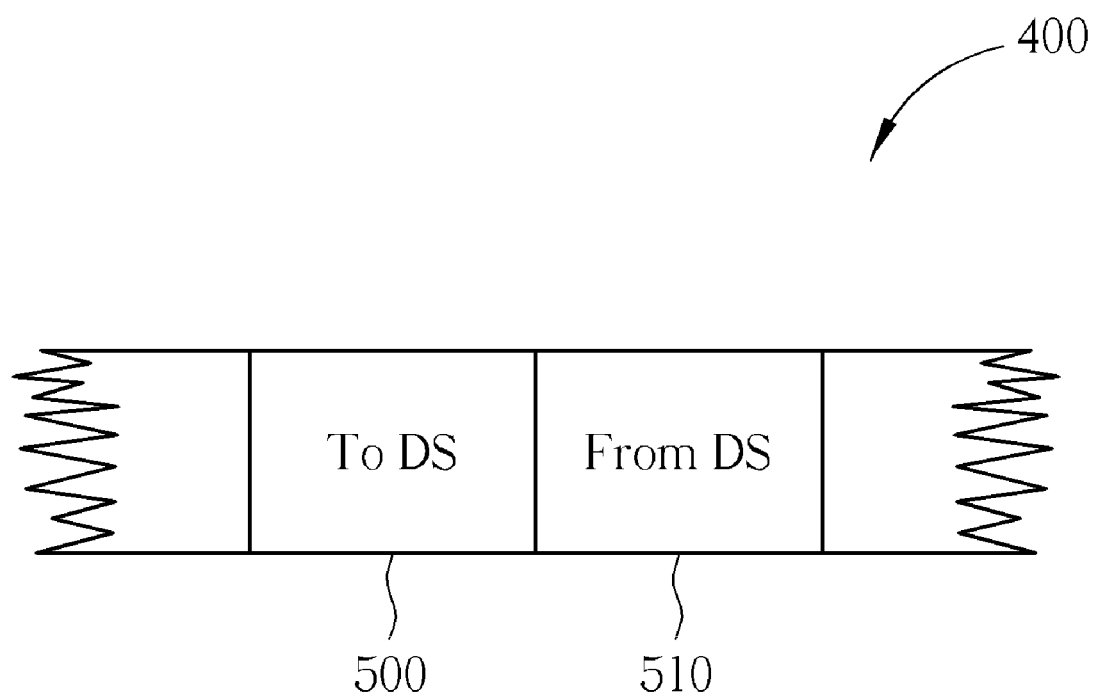
FIG. 5 is a schematic diagram of a format of a frame control shown in FIG. 4.

In FIG. 5, the "To DS" field 500 and the "From DS" field 510 are both represented by one bit. When the "To DS" field 500 and the "From DS" field 510 are both '0', the packet is a data packet transmitted between two stations within the same independent basic service set (IBSS). In this situation, the first, second and third address fields 420-440 respectively allocate a Destination Address (DA), a Source Address (SA), and a Basic Service Set Identification (BSSID).

When the "To DS" field 500 and the "From DS" field 510 are respectively '1' and '0', the packet is a data packet destined for a distribution system. In this situation, the first to the third address fields 420-440 are respectively allocated with a BSSID, SA, and DA.

When the "To DS" field 500 and the "From DS" field 510 are respectively '0' and '1', the packet is a data packet exiting the distribution system. In this situation, the first to the third address fields 420~440 are respectively allocated a DA, a BSSID, and a SA.

When the "To DS" field 500 and the "From DS" field 510 are both '1', the packet is a wireless distribution system packet transmitted between two access point devices. In this situation, the first to the fourth address fields 420-440 and 460 are respectively allocated with a Receiver Address (RA), a Transmitter Address (TA), a DA, and a SA. Take FIG. 1 as an example, when the station 102 transmits a security packet to the station 112, the first to the fourth address fields 420-440 and 460 are respectively allocated with addresses of the access point device 110, the access point device 100, the station 112, and the station 102.

The first three situations abovementioned indicate the original wireless distribution system packet, so the fourth address field is not used. The fourth situation indicates the WDS packet with the WPS function utilized in the embodiment of the present invention.

Figure 6:
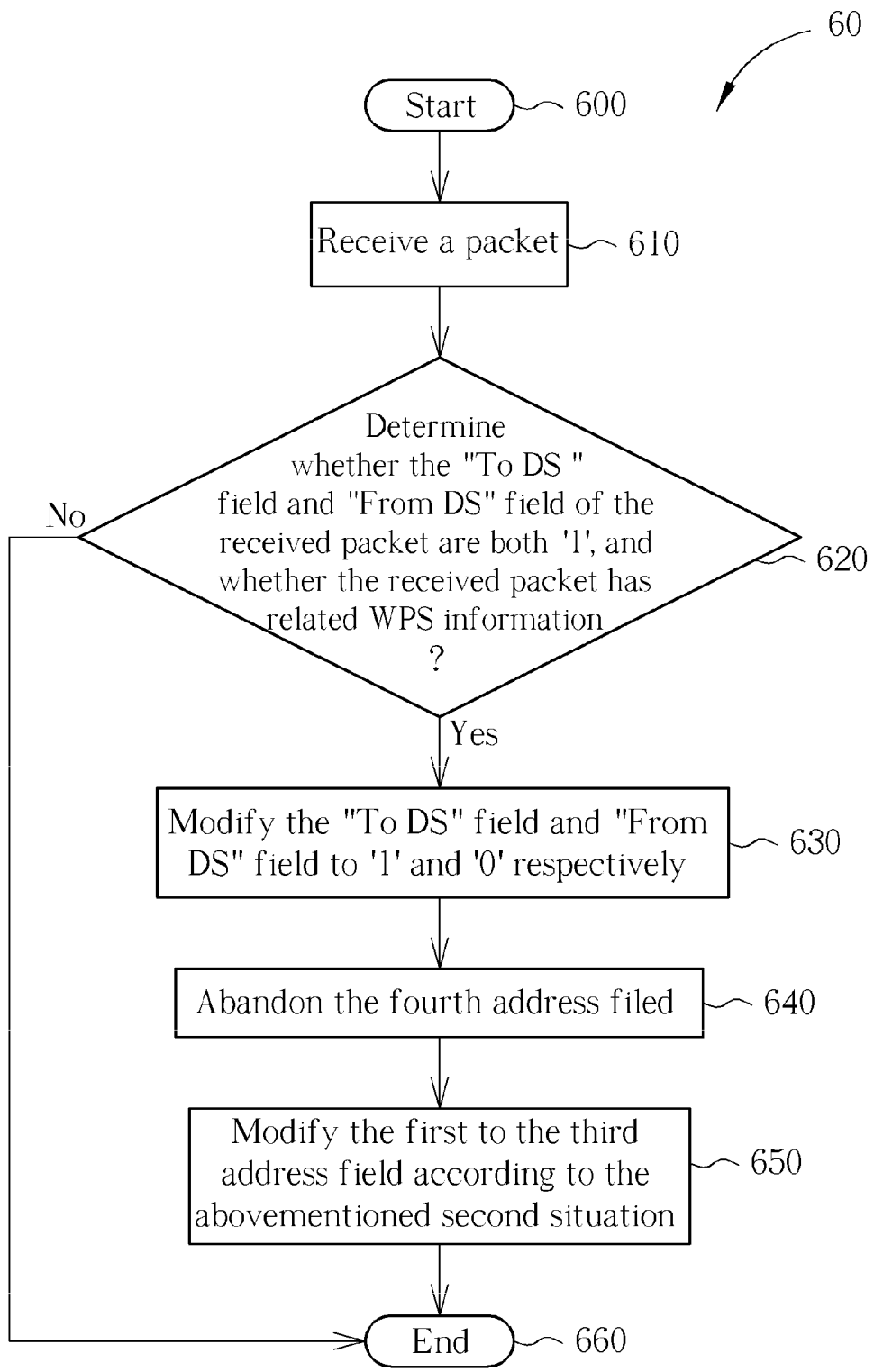
FIG. 6 is a flowchart diagram of a packet receiving process according to an embodiment of the present invention.

In order to introduce WPS packet function of the embodiment of the present invention to the existing WPS standard, those skilled in the art can modify the operation method of the access point device according to the following process. Please refer to FIG. 6, which is a flowchart diagram of a packet receiving process 60 according to an embodiment of the present invention. The packet receiving process 60 is used for recognizing received packet varieties according to the abovementioned settings of the "To DS" and the "From DS" fields, and includes the following steps:

Step 600: Start.

Step 610: Receive a packet.

Step 620: Determine whether the "To DS" field and "From DS" field of the received packet are both '1', and whether the received packet has related WPS information. If yes, execute Step 630; otherwise, execute Step 660.

Step 630: Modify the "To DS" field and "From DS" field to '1' and '0' respectively.

Step 640: Abandon the fourth address filed.

Step 650: Modify the first to the third address field according to the abovementioned second situation.

Step 660: End.

According to the packet receiving process 60, the embodiment of the present invention determines the received packet to be a WPS packet of the wireless distribution system when the "To DS" field and "From DS" field are both '1', and related WPS information is confirmed. Then, the "To DS" field and "From DS" field are modified to '1' and '0' respectively. The fourth address filed is abandoned, and the first to the third address fields are modified according to the second situation (the "To DS" field='1'; the "From DS" field='0').

After this, the received packet is seen as the original WPS packet, to avoid being abandoned because of format incompatibility.

Figure 7:
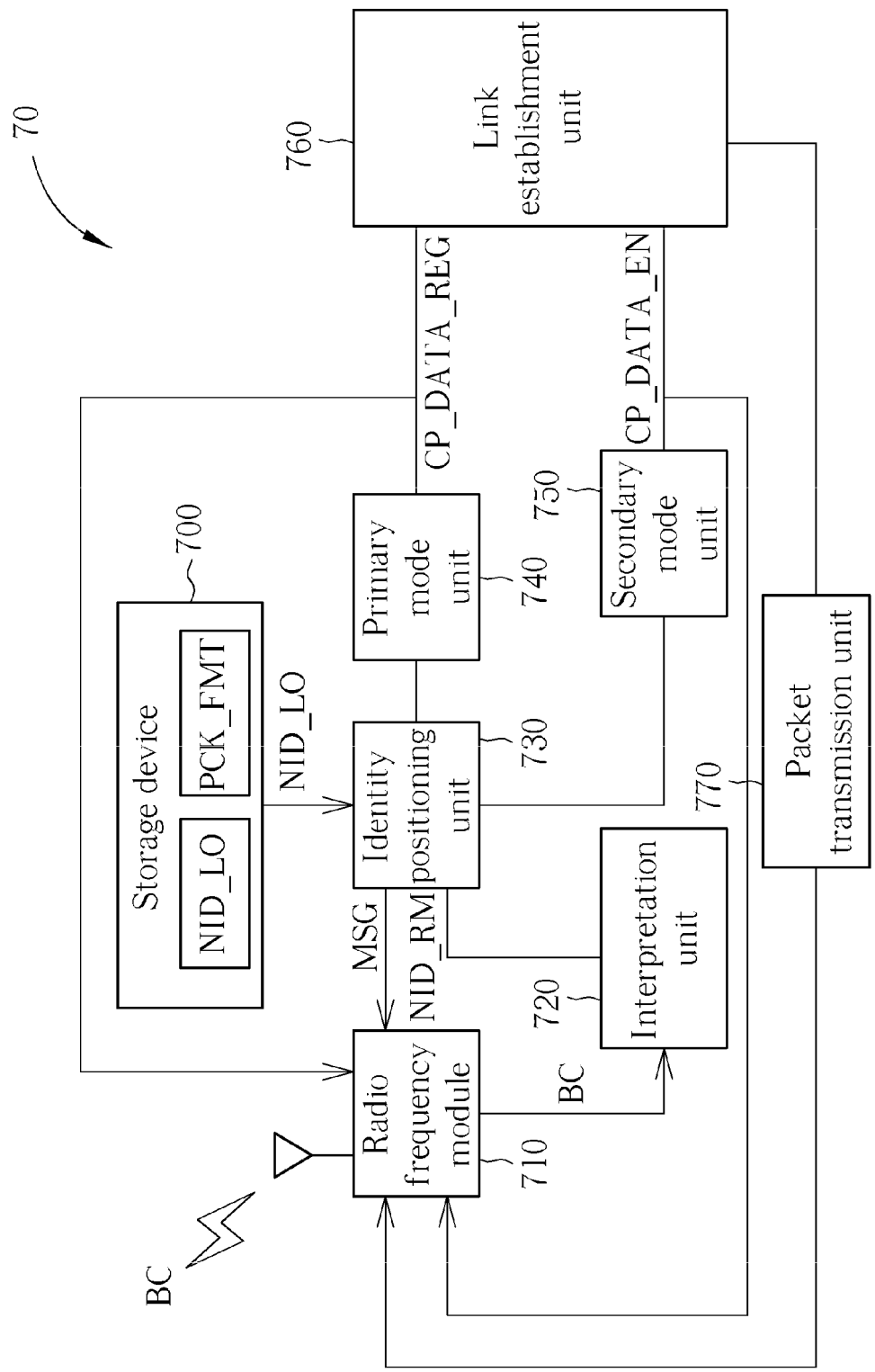
FIG. 7 is a schematic diagram of an access point device according to an embodiment of the present invention.

Please refer to FIG. 7, which is a schematic diagram of an access point device 70 according to an embodiment of the present invention. The access point device 70 is used for realizing the link preparation process 20 of the first stage and the link connection set handshaking process 30 of the second stage to automatically establish a security link with a peer access point device. The access point device 70 can be the access point device 100 or 110 shown in FIG. 1, and includes a storage device 700, a radio frequency module 710, an interpretation unit 720, an identity positioning unit 730, a primary mode unit 740, a secondary mode unit 750, a link establishment unit 760, and a packet transmission unit 770. The storage device 700 is used for storing a preset packet header format PCK_FMT and network identity information NID_LO of the access point device 70, which includes a device name, e.g. Service Set Identifier (SSID), a MAC address, etc. The radio frequency module 710 is used for searching and receiving a beacon BC corresponding to the peer access point device by radio frequency scan. The interpretation unit 720 is used for obtaining network identity information NID_RM corresponding to the peer access point device from the beacon BC. The identity positioning unit 730 is used for determining a primary-secondary relationship for the access point device 70 and the peer access point device according to the network identity information NID_LO and NID_RM.

When the primary-secondary relationship indicates that the access point device 70 is a primary device, e.g. a registrar, the primary mode unit 740 generates security data CP_DATA_REG and transmits the security data CP_DATA_REG to the peer access point device via the radio frequency module 710. In this situation, the secondary mode unit 750 enters an inactive state, and the link establishment unit 760 establishes the security link with the peer access point device according to the security data CP_DATA_REG.

When the primary-secondary relationship indicates that the access point device 70 is a secondary device, e.g. an enrollee, the secondary mode unit 750 receives security data CP_DATA_EN from the peer access point device via the radio frequency module 710. In this situation, the primary mode unit 740 enters an inactive state, and the link establishment unit 760 establishes the security link with the peer access point device according to the security data CP_DATA_EN.

Figure 4:
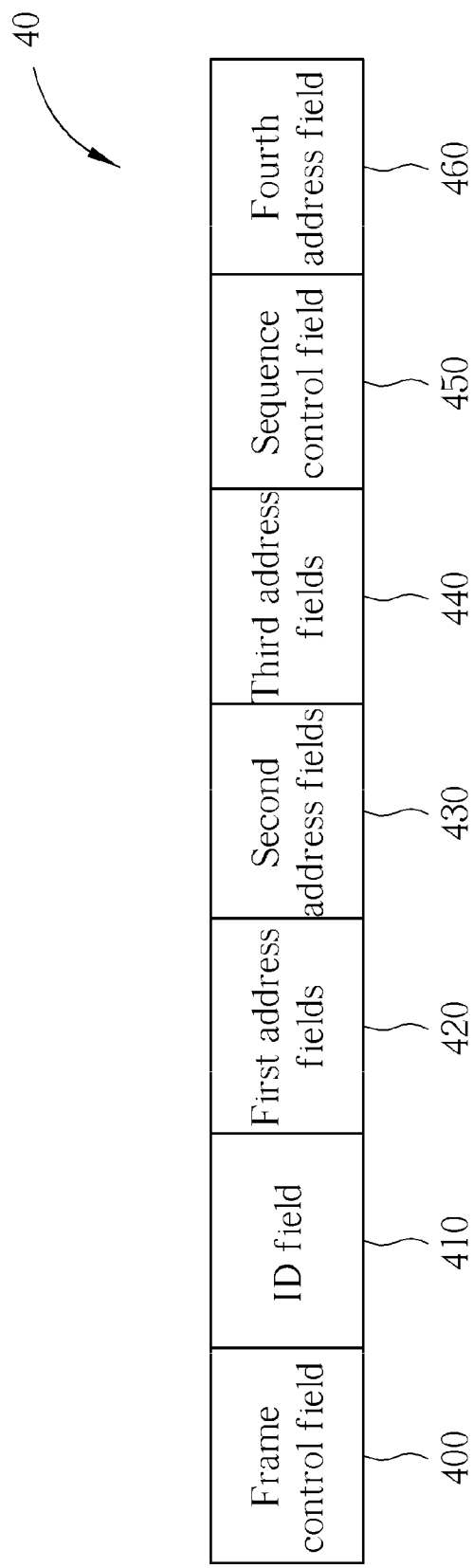
FIG. 4 is a schematic diagram of a medium access control packet header format according to an embodiment of the present invention.

Preferably, the security data CP_DATA_REG and CP_DATA_EN is generated according to the WPS standard, which includes a security key and encryption algorithm information. The packet transmission unit 770 determines a packet type corresponding to the WPS standard according to the preset packet header format PCK_FMT, and performs data transmission, encryption and decryption according to the preset packet header format PCK_FMT and the security data CP_DATA_REG or CP_DATA_EN. Since the access point device 70 realizes the link preparation process 20 and the link connection set handshaking process 30, the preset packet header format PCK_FMT is preferably used as shown in FIGS. 4 and 5, and the detailed description is omitted herein.

In conclusion, the embodiment of the present invention utilizes the link preparation process and the link connection set handshaking process for introducing the WPS standard into the access point device-access point device communication allowing two access point device to automatically share security data for security link establishment. Therefore, the embodiment of the present invention eliminates that an user has to manually set the security configuration, to enhance the user's willingness to use the security link function and the safety of network transmission.

Those skilled in the art will readily observe that numerous modifications and alterations of the device and method may be made while retaining the teachings of the invention.

What is claimed is:

1. A method utilized in an access point device having first network identity information for automatically establishing a security link with a peer access point device in a wireless communication system, the method comprising:
   searching and receiving a beacon corresponding to the peer access device by radio frequency scan;
   obtaining second network identity information corresponding to the peer access point device from the beacon;
   determining a primary-secondary relationship for the access point device and the peer access point device according to the first network identity information and the second network identity information;
   generating or receiving security data according to the primary-secondary relationship; and
   establishing the security link with the peer access point device according to the security data.

2. The method of claim 1, wherein determining the primary-secondary relationship for the access point device and the peer access point device according to the first network identity information and the second network identity information comprises determining a registrar-enrollee relationship, as the primary-secondary relationship, for the access point device and the peer access point device according to address information of the access point device and address information of the peer access point device.

3. The method of claim 2, wherein generating or receiving the security data according to the primary-secondary relationship comprises generating and transmitting the security data to the peer access point device when the access point device is a registrar and the peer access point device is an enrollee.

4. The method of claim 2, wherein generating or receiving the security data according to the primary-secondary relationship includes receiving the security data transmitted from the peer access point device when the access point device is an enrollee and the peer access point device is a registrar.

5. The method of claim 1, wherein the security data comprises a security key and encryption algorithm information and is generated according to a Wi-Fi Protected Setup (WPS) standard.

6. The method of claim 5 further comprising recognizing a packet type of the WPS standard according to a preset packet header format.

7. The method of claim 6 further comprising performing data transmission, encryption, and decryption according to the preset packet header format and the security data.

8. The method of claim 1, wherein the wireless communication system is a wireless distribution system.

9. An access point device for automatically establishing a security link with a peer access point device in a wireless communication system, the access point device comprising:
   a storage device for storing first network identity information;
   a radio frequency module for searching and receiving a beacon corresponding to the peer access point device by radio frequency scan;
   an interpretation unit coupled to the radio frequency module, for obtaining second network identity information corresponding to the peer access point device from the beacon;
   an identity positioning unit coupled to the interpretation unit and the radio frequency module, for determining a primary-secondary relationship for the access point device and the peer access point device according to the first network identity information and the second network identity information;
   a primary mode unit coupled to the identity positioning unit, for generating first security data to the peer access point device according to the primary-secondary relationship;
   a secondary mode unit coupled to the identity positioning unit, for receiving second security data transmitted from the peer access point device according to the primary-secondary relationship; and
   a link establishment unit coupled to the primary mode unit and the secondary mode unit, for establishing the security link with the peer access point device according to the first security data or the second security data.

10. The access point device of claim 9, wherein the identity positioning unit determines a registrar-enrollee relationship, as the primary-secondary relationship, for the access point device and the peer access point device according to address information of the access point device and address information of the peer access point device.

11. The access point device of claim 9, wherein the first security data and the second security data both comprise a security key and encryption algorithm information and are generated according to a Wi-Fi protected setup (WPS) standard.

12. The access point device of claim 11 further comprising a packet transmission unit for recognizing a packet type of the WPS standard according to a preset packet header format.

13. The access point device of claim 12, wherein the packet transmission unit performs data transmission, encryption, and decryption according to the preset packet header format and the first security data.

14. The access point device of claim 12, wherein the packet transmission unit performs data transmission, encryption, and decryption according to the preset packet header format and the second security data.

15. The access point device of claim 12, wherein the storage device further stores the preset packet header format.

16. The access point device of claim 9, wherein the wireless communication system is a wireless distribution system.

* * * * *